US005270753A

United States Patent [19]

Adler et al.

[11] Patent Number: 5,270,753

[45] Date of Patent: Dec. 14, 1993

[54] OPTICAL APERTURE DEVICE FOR MANUFACTURING COLOR CATHODE RAY TUBES

[75] Inventors: Robert Adler, Northfield; Howard G. Lange, Prospect Heights, both of Ill.

[73] Assignee: Zenith Electronics Corporation, Glenview, Ill.

[21] Appl. No.: 905,959

[22] Filed: Jun. 29, 1992

[51] Int. Cl.[5] .............. G03B 41/00

[52] U.S. Cl. .............. 354/1

[58] Field of Search .............. 354/1

[56] References Cited

U.S. PATENT DOCUMENTS

| | | | |
|---|---|---|---|
| 3,780,629 | 12/1973 | Barten et al. | 95/1 R |
| 4,025,811 | 5/1972 | Van Nes | 354/1 |
| 4,132,470 | 1/1979 | van Heek | 354/1 |
| 4,568,162 | 2/1986 | Ragland, Jr. | 354/1 |
| 4,586,799 | 5/1986 | Hayasni et al. | 354/1 |
| 4,634,247 | 1/1987 | Morrell et al. | 354/1 |
| 4,670,824 | 6/1987 | Kuki et al. | 354/1 |
| 4,983,995 | 1/1991 | Sugahara | 354/1 |
| 5,023,157 | 6/1991 | Testa | 354/1 |

FOREIGN PATENT DOCUMENTS

| | | | |
|---|---|---|---|
| 1319225 | 12/1989 | Japan | 354/1 |

*Primary Examiner*—Michael L. Gellner
*Assistant Examiner*—Nicholas J. Tuccillo

[57] ABSTRACT

An apertured member for use in a CRT screen manufacturing device, or lighthouse, is disclosed as being spaced from the light source and having a light-transmitting slot of approximately parabolic shape. The axis of the parabola which is perpendicular to the CRT screen being made. This apertured member is useful for correcting beam landing misregistration errors resulting from the use of a self-converging yoke with the CRT.

1 Claim, 2 Drawing Sheets

OPTICAL APERTURE DEVICE FOR MANUFACTURING COLOR CATHODE RAY TUBES

BACKGROUND OF THE INVENTION

1. Field of the Invention

The invention relates to an optical aperture device used in the manufacture of color cathode ray tubes (CRTs) of the dot matrix type.

2. Discussion of the Related Art

The display screen for such a dot matrix CRT comprises a large number of phosphor dots, usually embedded in or surrounded by a matrix of black, non-luminescent material. This matrix, as well as the phosphor dots, are deposited on the transparent face plate by well-known photolithographic processes, with an apertured shadow mask serving as the photo-stencil. The same mask is later mated with the screen during final assembly of the tube, in order to provide the closest registration between the location of the phosphor dots, produced by light beams, and the location of electron beam landings which illuminate the phosphor dots in the working CRT. The precise location of the dots on the screen is of great importance, as it determines the color purity and brightness uniformity of the finished tube. In modern high-resolution computer display tubes, dot location tolerances on the order of 0.0005 inches or less are common.

The light source for the photolithographic process usually takes the form of a high pressure mercury arc lamp. The length of the light-producing arc in such a lamp is normally much greater than its width; therefore a slotted aperture device, or diaphragm, closely adjacent to the lamp and oriented perpendicularly to the axis of the lamp is often used to produce an effective light source of approximately square cross section.

In a finished tube, the magnetic field produced by the deflection yoke bends the trajectories of the electrons emitted by each of the three electron guns and thus distributes them across the screen. However, if the trajectories of the electrons arriving at the screen from one particular gun are extended or extrapolated backwards, they do not appear to come from a single point; therefore, these trajectories cannot be simulated by light rays diverging from a single point source. For this reason, during the photolithographic exposure an aspherical correction lens is normally inserted between the light source and the shadow mask. Such a lens can be tailored, for example by a process of successive approximation, to modify the pattern of light rays so that it closely matches the pattern of electron trajectories mentioned above. For tubes of low to moderate resolution the resulting match may be good enough.

It has long been known, however, that the aspherical lens cannot provide a perfect match, or registration, between phosphor dot placement and electron beam landing, and means have been sought to correct the remaining errors, hereinafter called "beam landing errors." U.S. Pat. No. 3,780,629 to Barten and Ferguson teaches the use of a diaphragm having an aperture in the form of a crescent moon or horseshoe-shaped slot, inserted between an elongated arc lamp and the aspherical correction lens. The diaphragm lies either in a plane parallel to the axis of the light source, or in a cylindrical surface parallel to that axis. In a preferred embodiment, the cylindrical surface is concentric with the light source.

In the Barten-Ferguson device, the slot in the diaphragm is not closely adjacent to the elongated light source but is spaced therefrom. As a consequence, when the light source is viewed from different points on the screen, different portions of the lamp become visible through the slot. It might be said that the apparent point source is displaced when viewed from different points on the screen. This displacement, controlled by the shape of the slot and by its spacing from the light source, provides an extra variable which may be used to correct for some beam landing errors.

In the years since the Barten and Ferguson patent issued, the use of self-convergent deflection yokes for CRTs has become nearly universal. In this type of yoke, the magnetic deflection fields are intentionally made non-uniform. A pincushion-shaped field is used for horizontal deflection and a barrel-shaped field for vertical deflection. In addition, field shape varies along the yoke axis from the gun side to the screen side; for example, to minimize raster distortion, the vertical deflection field may change from barrel shape on the gun side to pincushion shape on the screen side. Electrons, during their travel through such a field, are subjected to transverse forces whose direction varies from point to point. The resulting twisting of the electron beam trajectories cannot be simulated by an optical lens having continuous (i.e. unbroken) surfaces. Thus, the resultant registration errors, sometimes referred to as "curl errors", have gone largely uncorrected in tubes that are screened with continuous lenses.

FIG. 1 illustrates the type of residual beam-landing errors observed on a tube using a self-convergent yoke. Only the centrally positioned "green" electron gun was turned on when the data was taken. The correction lens employed in making the screen had been designed to reduce the mean square beam landing error to a minimum. In the figure, each arrow represents the additional correction required, i.e., how far and in what direction the phosphor dots in that particular portion of the screen should be moved for perfect registration between light beam and electron beam landing. Conspicuous features of FIG. 1 are the swirl patterns and their apparent fourfold symmetry, i.e., an antisymmetric matrix form. With proper orientation of the yoke the symmetry axes correspond to the horizontal and vertical center lines of the screen. The Barton-Ferguson device cannot correct for this type of error distribution which is largely the result of the self converging yoke.

In the following discussions and figures, the axes will have the following designations: the X-axis represents the major axis of a rectangular CRT screen and the x-axis is parallel to it, but lies in the plane of the light source used to make the screen. The Y-axis represents the minor axis of the screen, and the y-axis is parallel to the Y-axis, but again lies in the plane of the light source. The z-axis is perpendicular to the screen, passes through the light source, and represents the axis of the finished tube.

It is convenient to consider the individual arrows in FIG. 1 as vectors F having two components FX and FY. Each of these components is a function of the screen coordinates X and Y. There are 9 rows of 11 vectors each in FIG. 1; together, these 99 vectors form a vector field.

Vector analysis defines a vector, curl F, whose magnitude, in the case of two dimensions, equals the difference between the partial derivatives of FY with respect to X and FX with respect to Y. The value of curl F corresponding to the vector field shown in FIG. 1 is plotted in FIG. 2, with circles indicating counterclockwise rotation and hexagons indicating clockwise rotation; the magnitude of rotation is proportional to the diameter of the circles or hexagons.

It can be shown that a lens with continuous surfaces cannot correct for those portions of the beam landing error F (X,Y) which produce finite values of curl F. Segmented lenses can correct for these curl errors but are very expensive to make.

It is, therefore, an object of this invention to provide means for minimizing the value of curl F, where F is a vector representing the beam landing error, and to do so throughout the range of screen coordinates X and Y.

It is a further object of the invention to provide means for minimizing the value of curl F, said means being constructed and arranged to take advantage of the high degree of symmetry in the distribution of curl F across the screen encountered when a self-convergent yoke is used for beam deflection.

It is also an object of the invention to provide photolithographic exposure apparatus in which an apertured member carrying a slot is inserted between an elongated light source and a correction lens, the center line of said slot lying in a plane which: 1) is perpendicular to said light source, and 2) contains an axis of symmetry of the uncorrected distribution of curl F. This axis of symmetry is usually, although not necessarily, the X or Y axis of the screen, as described above.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

DETAILED DESCRIPTION OF THE PREFERRED EMBODIMENT

Figure 3:
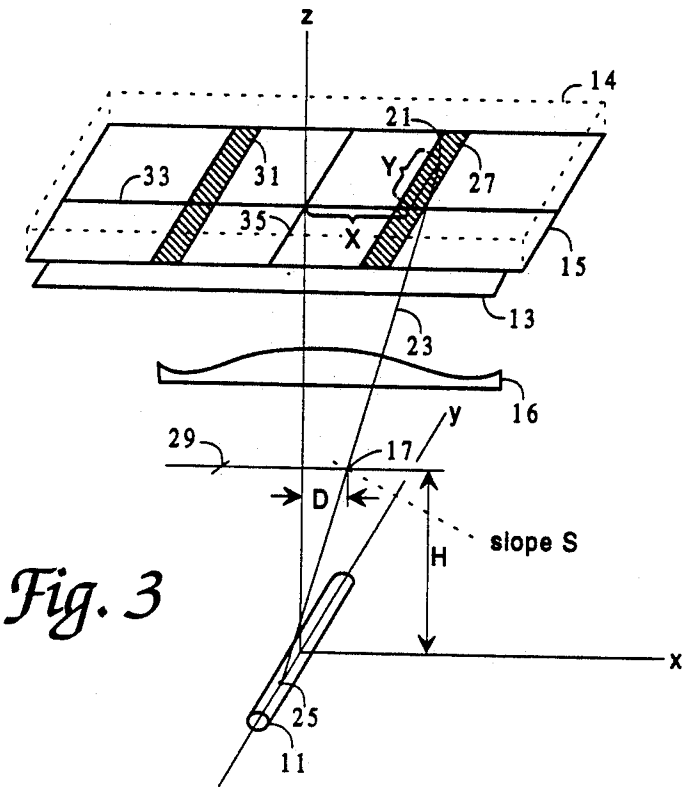
FIG. 3 illustrates the principles of the present invention in the environment of the screen exposure apparatus.
Figure 4:
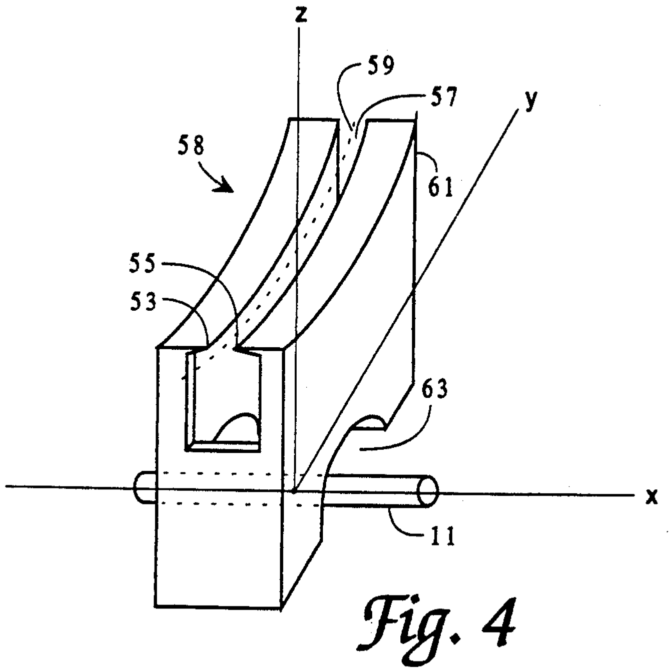
FIG. 4 illustrates the present invention according to the preferred embodiment.

FIG. 3 schematically illustrates a screen exposure apparatus according to the present invention for explanation of the underlying principles. Reference will also be taken to FIG. 4 which shows a preferred embodiment of an apertured member 58 according to the present invention. An extended light source 11, typically a high pressure mercury arc lamp, is located along the y-axis. Suspended in a horizontal plane above the light source 11 is a shadow mask 13 which performs the known function of a photostencil. The mask 13 may, in practice, be a flat tension mask as described, for example, in U.S. Pat. No. 4,794,299. Above the mask 13, spaced from it and extending parallel to it is the inside, or screening, surface 15 of a flat faceplate 14 which is to be exposed to create a screen. To avoid obstructing surface 15 in FIG. 3, the faceplate 14 is shown in phantom. At a height H and a distance D to the right of the z-axis, which is the vertical center line of the figure, a short segment 17 of a slot is shown; this segment lies in the x-z plane and has a downward tilt with a slope S.

The required correction lens 16 is positioned between the slot segment 17 and the shadow mask 13. For the sake of clarity, dimensional ratios in the figure are distorted; in practice, H would be a much smaller fraction of the height of mask 13 above light source 11, and even the distance from slot segment 17 to the correction lens 16 would be several times larger than H.

One point 21 on the surface 15, with coordinates X and Y, is shown, together with the light ray 23 which connects it to a point 25 on the lamp 11 while passing through the slot segment 17.

Slot segment 17 illuminates a narrow vertical stripe 27, parallel to the Y-axis, on the screen surface 15, i.e., a stripe whose average coordinate X is constant and whose width is determined by the length of slot segment 17. It can be shown that the tilt S of slot segment 17 produces a curl component in the screen pattern which is equal to a constant times the product of S.,H., and Y. Thus, the curl component is proportional to the tilt S and height H of the slot segment while varying linearly with Y. Along the horizontal center line 33 of the screen, where $Y=0$, the curl component vanishes; it is antisymmetrical with respect to the X-axis, or horizontal center line 33, of the screen surface 15.

Additional segments may be added to segment 17 so as to form an arbitrarily shaped slot whose center line lies in the x-z plane, and in this manner any desired distribution of curl components along the X-direction may be realized. Along the Y-direction, the distribution will always be antisymmetrical, with the curl component vanishing on the Y-axis, or vertical center-line 35, of the screen surface 15.

For example, a second slot segment 29 symmetrically positioned about the Y-axis 35 with respect to slot segment 17 and having a slope of $-S$ will illuminate a second stripe 31 on the screen surface 15 located symmetrically to stripe 27; curl values within this stripe 31 will have signs opposite to those in stripe 27 at any given value of Y, thus providing fourfold symmetry. It must be emphasized, however, that while the linear behavior of the curl component with respect to Y within each stripe is an inherent property of the system, the distribution of that component with respect to X is a matter of choice, depending as it does on the slope and height of individual segments of the slot.

In practice, self-convergent yokes have been found to produce curl patterns which not only exhibit fairly good four-fold symmetry, but in which the magnitude of the observed curl F, before correction, increases approximately linearly with distance from either axis of symmetry, so that it is reasonably well represented by a constant multiplied by X.Y. Under these conditions, as seen in FIG. 4, the slot shape required to compensate for curl becomes a symmetrical arch approximating a parabola; the center line 59 of the slot 57 may be placed either in the X-Z plane as described above, with the lamp along the y-axis, or the slot 57 may lie in the Y-Z plane, while the lamp 11 is placed along the x-axis, as seen in FIG. 4. It has been found that with the first-mentioned arrangement, the slot must curve downward, convex to the screening surface; while with the second one, it must curve upward, concave to the screening surface.

The second-mentioned arrangement, i.e., that of FIG. 4, is preferred. It has been found that, in practice, the curl component before correction has better symmetry with respect to left vs. right than with respect to up vs. down. An arched slot placed in the y-z plane can be shaped to compensate for imperfect symmetry of the vertical distribution while taking full advantage of the good right-left symmetry.

FIG. 4 illustrates the arrangement of the lamp 11 and the apertured member 58 in the preferred embodiment. Lamp 11 is now oriented along the X-axis, while the edges 53 and 55 of the apertured member 58 form an upwardly curved slot 57 extending parallel to the y-z plane, with its curved center line 59 lying within that plane. The exact shape of center line 59 is computed from a plot of curl F such as that shown on FIG. 2, and edges 53 and 55 are cut accordingly, for example by electrical discharge machining (EDM), into solid metal block 61. Alternatively, two blocks can be appropriately machined, one for each edge, and then juxtaposed to create the slot. Care must be taken to cut the edges, 53 and 55 under such angles that light rays aimed at the ends of the major axis or at the corners of the screen, i.e. at maximum values of X, are not obstructed. A channel 63 is provided in the block 61 to permit water cooling of the arc lamp 11. In practice, lamp 11 and block 61 are enclosed in a sealed lamp housing (not shown) through which cooling water is circulated.

Figure 2:
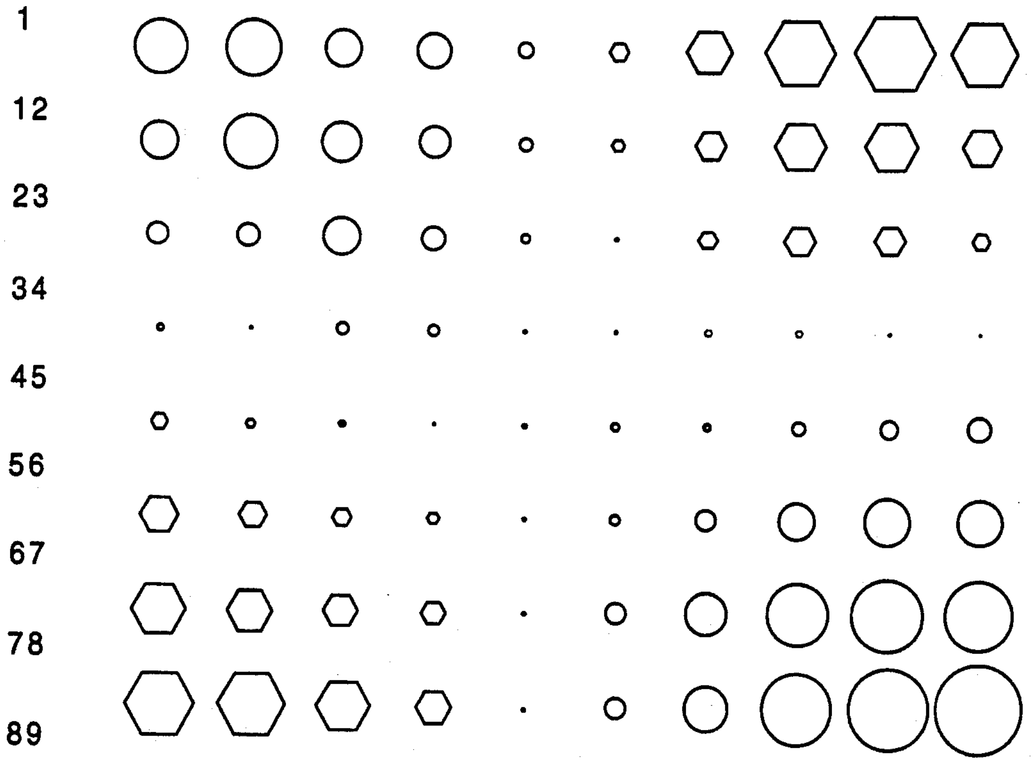
FIG. 2 is a graphic illustration of the values of curl error seen in FIG. 1.
Figure 5:
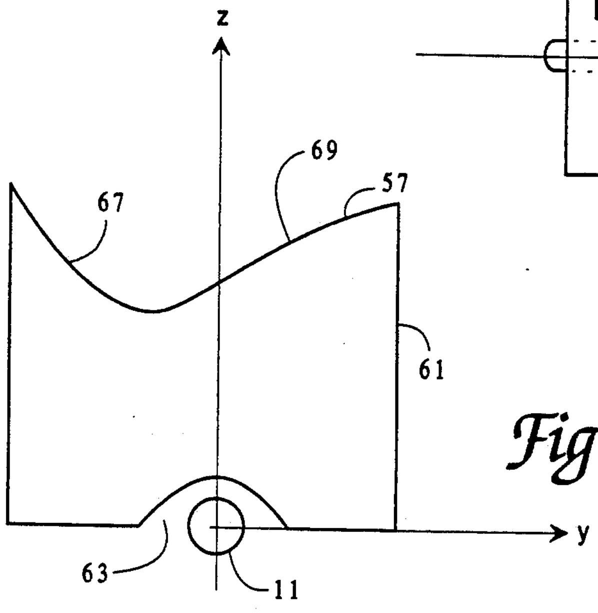
FIG. 5 illustrates an example of an apertured member with a nonsymmetrical slot.

The contour of slot center line 59 is designed by segments so as to minimize curl F in each of the eight rows of FIG. 2. The height H of the first segment may be chosen on the basis of purely mechanical considerations; however, once that choice has been made, the slope S of the first segment is determined by the sign and magnitude of the curl compensation required in that particular segment, which corresponds to a particular row in FIG. 2. The design then proceeds from segment to adjacent segment, taking proper account of the fact that the height H changes as the integral of the slope S taken over the distance in x (FIG. 3) or in y (FIG. 4) from the first segment. Note that as seen in FIG. 5, the two halves 67, 69 of the slot 57 need not exhibit bilateral symmetry about the z-axis if curl error distribution so demands.

The distinction between X and Y axes is important: the three electron guns in a shadow mask color tube are normally placed in a plane which also contains the major axis of the screen. To bring the three electron beams into convergence, a self-convergent yoke must produce differently shaped fields in the horizontal and vertical directions, as discussed above. For this reason there is a physical difference, and not just a formal one, between the arrangements of FIG. 3 and FIG. 4.

Figure 1:
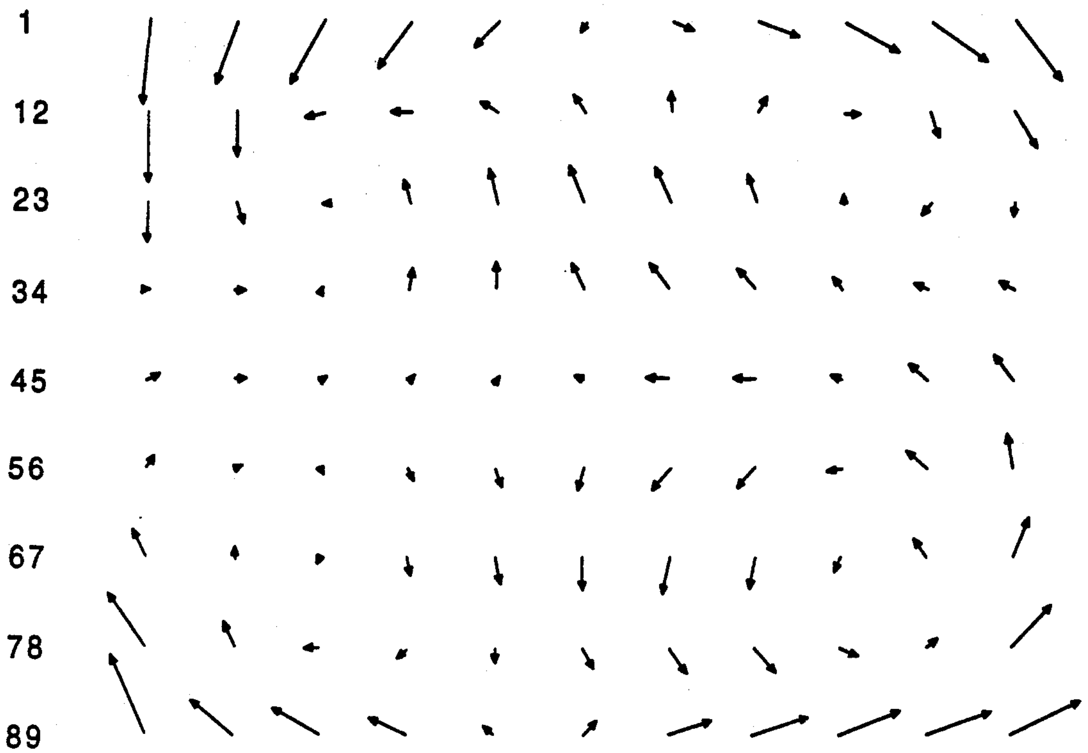
FIG. 1 illustrates beam landing curl errors one gets in a self-convergent yoke CRT with a screen made according to the known processes.

In the specific example illustrated in FIGS. 1 and 2, a slot constructed as shown in FIG. 4 with its center line 59 designed in accordance with the procedure outlined above reduced the root mean square registration error from 0.00042 inches to 0.00011 inches, an improvement by a factor of nearly four.

While the present invention has been illustrated and described in connection with the preferred embodiments, it is not to be limited to the particular structure shown, because many variations thereof will be evident to one skilled in the art and are intended to be encompassed in the present invention as set forth in the following claims:

Having thus described the invention,

What is claimed is:

1. An exposure device for manufacturing a color television display screen of the shadow mask type comprising a light source having an elongate light-emissive part, a correction lens system and an apertured member having an aperture in the form of a slot, said apertured member being present between the light source and the correction lens system and spaced from the light source, characterized in that: the slot is approximately parabolic with the axis of said approximately parabolic slot being substantially perpendicular to the display screen, the slot being constructed in a series of segments according to the magnitude of curl error correction required for a corresponding segment of the display screen, at least some of said segments having dissimilar slopes thereby producing a slot which is not bilaterally symmetrical thereby to compensate for curl error beam landing misregistration with imperfect four-fold symmetry of the type found in a self-convergent yoke CRT.

* * * * *